United States Patent [19]
Vickerman

[11] Patent Number: 5,348,480
[45] Date of Patent: Sep. 20, 1994

[54] STATISTICAL SAMPLING APPARATUS

[76] Inventor: Harold E. Vickerman, 3116 Joliet Ct., Mequon, Wis. 53092

[21] Appl. No.: 165,069

[22] Filed: Dec. 10, 1993

Related U.S. Application Data

[63] Continuation of Ser. No. 39,712, Apr. 1, 1993, abandoned, which is a continuation of Ser. No. 911,359, Jul. 9, 1992, abandoned, which is a continuation of Ser. No. 758,703, Sep. 9, 1991, abandoned, which is a continuation of Ser. No. 468,301, Jan. 22, 1990, abandoned.

[51] Int. Cl.$^5$ .............................................. G09B 23/02
[52] U.S. Cl. ............................ 434/188; 273/144 B
[58] Field of Search ..................... 434/188, 207; 273/138 R, 139, 144 R, 144 B

[56] References Cited

U.S. PATENT DOCUMENTS

| | | | |
|---|---|---|---|
| 704,979 | 7/1902 | Terrazas | 434/207 |
| 1,613,575 | 1/1927 | Brewer | 273/144 B X |
| 3,095,655 | 7/1963 | Berglund et al. | 434/188 |
| 3,679,211 | 7/1972 | Hartley | 273/144 B |
| 3,864,850 | 2/1975 | Helmelke | 434/207 |
| 4,444,394 | 4/1984 | Pasquine | 273/144 B |
| 4,545,578 | 10/1985 | Stagg | 273/144 B |
| 4,796,890 | 1/1989 | Snyder | 273/144 B |

FOREIGN PATENT DOCUMENTS 2491766  4/1982  France .................... 273/144 B

OTHER PUBLICATIONS

Quantum Co., Malta, New York, Oct. 1985.

*Primary Examiner*—Gene Mancene
*Assistant Examiner*—Jeffrey A. Smith
*Attorney, Agent, or Firm*—Quarles & Brady

[57] ABSTRACT

A statistical sampling apparatus is formed with a box-like enclosure having transparent top, front and bottom walls. A stationary ledge extends in a plane between the top and bottom walls and stops short of the front wall so that there is a space that communicates between the volume below the ledge and the volume above the ledge. A plurality of identically shaped beads are disposed within the enclosure. The upper surface of the ledge has a patterned array of identical recesses which receive certain of the beads when the enclosure is up-ended and the beads are allowed to wash over the ledge. The beads are of different colors in a known distribution, and the patterned array of recesses is divided into series of a smaller numbers of recesses for statistical sampling purposes.

2 Claims, 1 Drawing Sheet

STATISTICAL SAMPLING APPARATUS

This application is a continuation of prior application Ser. No. 08/039,712 filed Apr. 1, 1993 and now abandoned, which is a continuation of prior application Ser. No. 07/911,359 filed Jul. 9, 1992 and now abandoned, which is a continuation of prior application Ser. No. 07/758,703 filed Sep. 9, 1991 and now abandoned, which is a continuation of prior application Ser. No. 07/468,301 filed Jan. 22, 1990 and now abandoned.

BACKGROUND OF THE INVENTION

This invention relates to a statistical sampling apparatus and more particularly to a device for demonstrating random sampling procedures.

Statisticians have long used a Shewart bowl for simulated sampling for experimentation and training. The bowl is used to demonstrate such things as the reject rate for very large quantities of manufactured goods. That is, a certain number of a large quantity of manufactured goods will be above or below acceptable range of deviation from the ideal. Since it is not generally necessary or desirable to test every one of the products, statistical sampling is used to determine how large a sample is required for finding rejects.

The early Shewart bowl used colored beads in a bowl with a paddle having recesses. The paddle was used to scoop beads out of the bowl with a portion of the beads settling into the recesses. This simulated sampling from the large quantity of beads in the bowl to those that were selected on the paddle. The use of an open bowl with the paddle was subject to spillage, particularly when used for training use, and the loss of beads changed the known reject (defect) rate thereby necessitating recounting of the beads.

In order to prevent spillage, it has been proposed in U.S. Pat. No. 3,095,655 to Berglund, et al., issued Jul. 2, 1963 to use a closed box containing colored beads. The paddle of the Shewart bowl is replaced by two plates that have matching holes. One of the plates is shifted to an offset from the other by a spring. Pressing a lever on the outside of the box aligns the two plates and allows beads above the plates to enter the holes and pass through the shiftable plate into the fixed plate. The fixed plate has its top face directly against a transparent cover and the beads are held captive in the fixed plate when the shiftable plate is again moved out of alignment with the fixed plate. This approach uses the distribution of bead colors to set the expected reject rate, and in its commercial embodiment, uses patterns of drilled holes to facilitate a choice of sample size.

This approach does away with the problem of spillage attendant with the original Shewart bowl. However, the device has moving parts which can result in jamming of the unit by beads.

I have developed a much simpler approach which does away with the spillage problem while eliminating all moving parts.

SUMMARY OF THE INVENTION

In accordance with the invention, I provide a statistical sampling apparatus comprising a box-like enclosure having a transparent top, a stationary ledge positioned intermediate the top and bottom of the enclosure and extending only part way across the width of the enclosure, the ledge having a series of recesses in its upper surface, and a plurality of colored balls of known distribution disposed within the enclosure.

The invention further relies in a series of indicia for the pattern of recesses in the ledge, dividing said recesses into different areas containing predetermined numbers of recesses.

In accordance with the preferred embodiment, the enclosure may have its bottom and front walls also formed of a transparent material and the indicia may be provided by colored bands defining the finite areas of recesses.

It is a principal object of the invention to provide a statistical sampling apparatus that is very simple in construction and operation and which is efficient in use.

The foregoing and other objects and advantages will appear in the detailed description that follows. In the description, reference is made to the accompanying drawings which illustrate a preferred embodiment.

DETAILED DESCRIPTION OF THE PREFERRED EMBODIMENT

Figure 1:
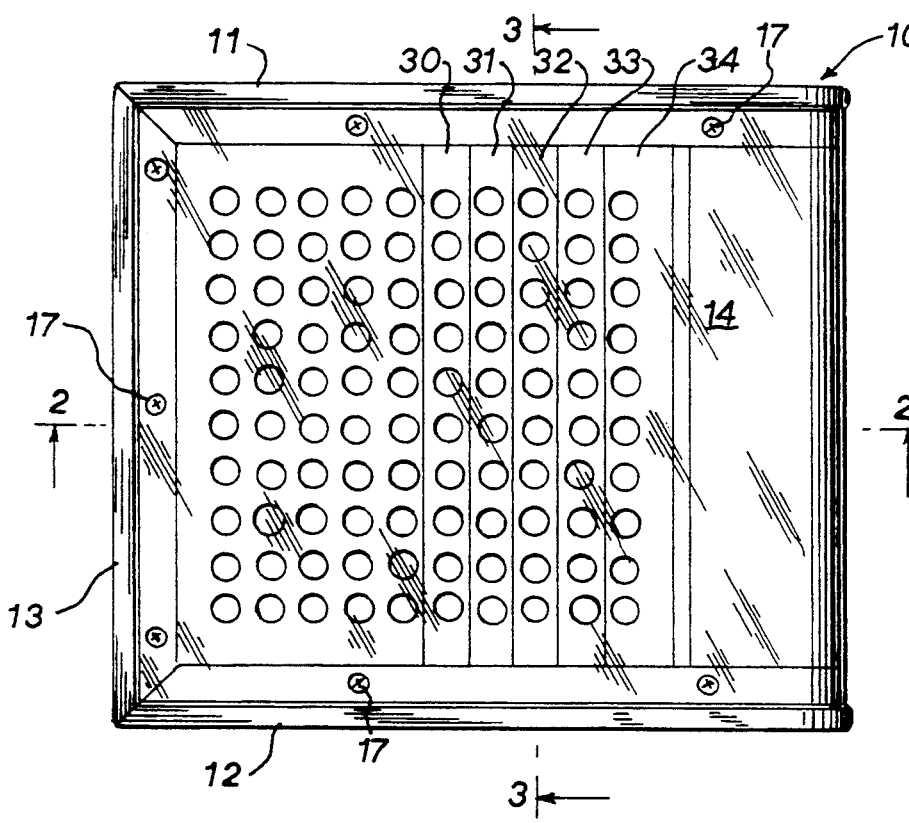
FIG. 1 is a top plan view of an apparatus in accordance with the invention.
Figure 2:
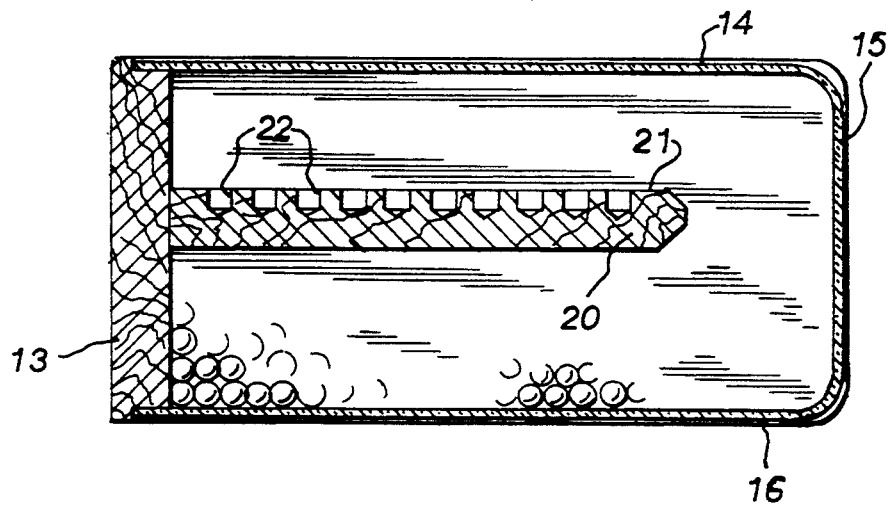
FIG. 2 is a view in vertical section taken in the plane of the line 2—2 of FIG. 1.
Figure 3:
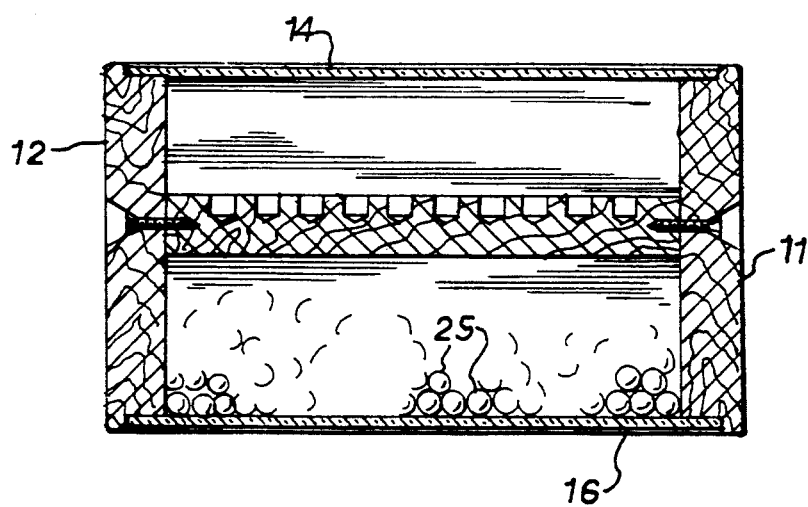
FIG. 3 is a view in vertical section taken in the plane of the line 3—3 of FIG. 1.

The apparatus includes a box-like enclosure 10 formed with wooden side walls 11 and 12 and a wooden rear wall 13. The remainder of the enclosure 10 is defined by a single sheet of transparent plastic material, such as Lucite, which is bent to form a top wall 14, a front wall 15 and a bottom wall 16. The upper and lower edges of the side walls 11 and 12 and rear wall 13 are recessed to accept the sheet of plastic material which is held in place by a series of screws 17.

A wooden ledge 20 is disposed in a plane intermediate the top and bottom walls 14 and 16, respectively. The ledge 20 is screwed to the side walls 11 and 12 and is also screwed to the back wall 13. The ledge extends from the back wall 13 and spans the distance between the side walls 11 and 12 but stops short of the front wall 15 so that a space exists that joins the volume defined below the ledge 20 with that defined above the ledge. The upper face 21 of the ledge 20 is provided with a pattern of bead recesses 22 in a regular array. As shown in the drawings, the patterned array may preferably consist of ten rows each containing ten recesses for a total of one hundred recesses.

A plurality of colored beads 25 are disposed within the enclosure 10. The beads 25 are of a known distribution of different colors which represent a normal distribution along a bell curve, for example. One distribution of beads may follow the following prescription: one percent blue, four percent green, ten percent red, fifteen percent orange, twenty percent yellow and the remaining fifty percent white. The beads 25 may be spherical or generally spherical.

When the enclosure 10 is upended, the beads 25 that are normally in the bottom of the enclosure can wash across the upper surface of the ledge 20 and nestle into the recesses 22. The distribution by colors in those recesses gives a statistically significant sampling of the entire universe of beads.

The beads 25 are all trapped within the enclosure 10 and none can spill out. Also, the entire sampling action is carried out by a user by the simple act of inverting the enclosure 10 without the need for any moving parts.

The upper surface 21 of the ledge 20 can be divided into discrete smaller areas. As shown in FIG. 1, the ledge 20 may have a series of areas 30, 31, 32, 33 and 34 each defined by a different color on the surface 21 with each area encompassing ten recesses. This allows a choice of sample size from ten to one hundred with increments in between.

Although beads have been described as the preferred article for reception by the recesses, any other article of relatively uniform shape and size could be employed and the recesses could be adjusted in shape and size accordingly. The important consideration is that the beads be able to fill the recesses relatively quickly and that all of the articles be of a uniform size and shape.

I claim:

1. A statistical sampling apparatus comprising:
    a box-like enclosure having a top, a bottom, a front wall, a rear wall, and two side walls, said top being transparent;
    a stationary ledge disposed between the top and the bottom and extending between the side walls and from the rear wall towards the front wall, a front edge of said ledge being spaced from the front wall to define a passageway connecting the volume underneath the ledge with the volume above the ledge,
    an upper surface of said ledge having a plurality of identical recesses formed in a regular array,
    said array of recesses being sub-divided into smaller arrays of recesses with the smaller arrays being distinguishable from each other by color; and
    a plurality of groups of identical objects disposed within the enclosure and each adapted to be received in any one of said recesses, the number of objects being greater than the number of recesses, each group being visually distinguishable from every other group.

2. A statistical sampling apparatus in accordance with claims 1 wherein the top, bottom and front walls are formed of a single sheet of transparent material.

* * * * *